United States Patent
Shrikrishna

(12) 
(10) Patent No.: US 7,259,574 B2
(45) Date of Patent: Aug. 21, 2007

(54) SENSOR DEVICE FOR MEASURING FREQUENCY AND AMPLITUDE OF VARYING FORCE SIGNALS

(76) Inventor: Vaidya Avinash Shrikrishna, 49/39, Erandavana, Mayuri Apt, Gulmohar Lane, Law College Road., Pune- 411 004, Maharashtra (IN)

( * ) Notice: Subject to any disclaimer, the term of this patent is extended or adjusted under 35 U.S.C. 154(b) by 175 days.

(21) Appl. No.: 11/129,737

(22) Filed: May 13, 2005

(65) Prior Publication Data

US 2006/0230841 A1 Oct. 19, 2006

(30) Foreign Application Priority Data

Apr. 15, 2005 (IN) .................. 467/MUM/2005

(51) Int. Cl.
*G01R 27/26* (2006.01)
*G01H 13/00* (2006.01)
*G01D 1/00* (2006.01)
*G01F 1/32* (2006.01)

(52) U.S. Cl. .................. 324/681; 73/581; 73/862.53; 73/861.24

(58) Field of Classification Search .................. 73/581, 73/862.53, 861.24
See application file for complete search history.

(56) References Cited

U.S. PATENT DOCUMENTS

| | | | | |
|---|---|---|---|---|
| 3,979,951 | A | * | 9/1976 | Munden et al. ................ 73/159 |
| 6,958,614 | B2 | * | 10/2005 | Morimoto .................... 324/661 |
| 7,148,704 | B2 | * | 12/2006 | Philipp ....................... 324/686 |
| 2003/0222660 | A1 | * | 12/2003 | Morimoto .................... 324/661 |
| 2004/0037016 | A1 | * | 2/2004 | Kaneko et al. ................. 361/1 |
| 2007/0034019 | A1 | * | 2/2007 | Doihara et al. ......... 73/861.355 |

* cited by examiner

*Primary Examiner*—Walter Benson
*Assistant Examiner*—Jeff Natalini
(74) *Attorney, Agent, or Firm*—Charles A. Muserlian

(57) ABSTRACT

A sensor device for measuring frequency and amplitude of a varying force signal is provided. The sensor device comprises a sensing element defined by a plurality of even numbered planar segments symmetrically disposed about a central axis, a protective housing for housing, an interface element comprising a pick up member, a planar mechanical actuator, a transfer member adapted to receive varying signals from the pick up, amplify the signals picked up and transfer the amplified signals to the said mechanical actuator; and leads for transmitting said output signals outside the sensing device for processing.

23 Claims, 18 Drawing Sheets

SENSOR DEVICE FOR MEASURING FREQUENCY AND AMPLITUDE OF VARYING FORCE SIGNALS

FIELD OF THE INVENTION

This invention relates to sensor devices.

In particular, this invention relates to sensor devices for measuring frequency and amplitude of varying force signals.

BACKGROUND OF THE INVENTION

The prior art sensor devices typically in instruments such as flow meters have the problem that it has proved impossible to obtain a construction resistant to vibration, temperature, temperature shock and corrosive media. Use is made of strain gauges disposed on the outside of the plate. If piezoelectric sensors are disposed inside the instruments, they are mechanically so connected thereto the sensor has only limited resistance to temperature and shock.

The prior art sensor devices typically include a probe or signal pick up means usually fitted in juxtaposition with a signal generator such as a bluff body of a vortex flow meter, either within it or aligned down stream to it and the sensing element is usually located outside the fluid conduit and secured to the probe. The sensor device provides an output proportional to the deflection or strain generated in the probe by the pressure fluctuations caused by the flow of fluid through the conduit.

Such deflective sensors have the disadvantage that they are unable to discriminate between external vibrations in addition to frequency and amplitude of the signals generated for instance, by the flow of fluid. External vibrations degrade the output signal from the sensor, and restrict the lower end of the useable measurement range of the flow meter. External vibrations are caused, for example, by the operation of nearby pumps, valves, or other process machinery.

A strain detecting system is disclosed in the U.S. Pat. No. 3,972,232, in which a vortex generator of a flexible material was provided and a strain detecting element was bonded thereto isolated from outside by means of a diaphragm, with the chamber being filled with oil. A solid construction can not be attained due to flexibility of the sensor and the diaphragm. Moreover, because of oil, the sensor device could not be operated in a high temperature range.

The piezoelectric effect was discovered by Jacques and Pierre Curie in 1880. They found that if certain crystals were subjected to mechanical strain, they become electrically polarized and the degree of polarization was proportional to the strain applied. The Curies also discovered that these same materials deformed when they were exposed to an electric field. This has become known as the Inverse Piezoelectric Effect.

The piezoelectric effect is exhibited by a number of naturally occurring crystals. For instance, Quarts, Tourmaline etc., and these have been used for many years as electromechanical transducers. For a crystal to exhibit the piezo-electric effect, its structure should have no center of symmetry. A stress tensile or compression applied to such a crystal will alter the separation between the positive and negative charge sites in each elementary cell, leading to a net polarization at the crystal surface. The effect is linear, i.e. the polarization varies directly with the applied stress and direction-dependent, so that the compressive and the tensile stresses will generate electric fields, and hence voltages of opposite polarity. It is also reciprocal so that if the crystal is exposed to an electric field, it will experience an elastic strain causing its length to increase or decrease, according to the field polarity.

Besides the crystals mentioned above, there are several other types of materials available which exhibit piezoelectricity. For example, as applied to the present invention piezoelectric ceramics can be considered. They are obtained by sintering a finely ground powdered mixture, shaped in to required form by compressing—sintering—grinding—electroding—poling. In order to show the piezoelectric properties, the ceramic must be polarized. It is achieved by applying a strong electric field at a high temperature. After polarization, the polar axes of the various single crystals are oriented within a certain solid angle. The direction of polarization between neighbouring weiss domains within a crystallite can differ by 90 degrees or 180 degrees. The piezoelectric effect is used to design sensor elements for sensing pressure, flow, stress and strain and various other parameters. A piezo electrically generated voltage of the same polarity as the poling field occurs, due to compressive forces applied parallel to the poling axis or tensile forces applied perpendicular to the polar axis. Reversing the direction of the applied forces reverses polarity of generated voltages. This property of piezoelectric elements is particularly attractive since no external power is required to be applied to obtain output signals in response to a measurand and the piezoelectric response is quick and very sensitive, making piezoelectric elements excellent transduction elements for sensor devices.

In U.S. Pat. No. 4,248,098 a piezoelectric element composed of lithium niobate (LiNbO.sub.3) is employed for the sensor device. However, the sensor device does not at all tackle ambient noise signals. The arrangement of a single piezoelectric sensor provided on the vortex generator (or receiver), are subjected to a signal transformation. However, disadvantageously, this type of vortex flow meter is adversely affected or influenced, for example, by disturbance vibration, such as piping vibration caused by operation of a pump.

To overcome the in ability of the piezoelectric type sensing element to over come noise signals another arrangement was proposed in U.S. Pat. No. 4,437,350 a vortex flow metering apparatus was proposed comprising a sensor unit having two piezoelectric sensors selectively arranged in the concavity of a vortex generator The two piezoelectric sensors are required to be selectively arranged at two points whereat stress distribution of the noise component due to disturbance vibration and stress distribution of a signal component due to vortex dynamic lift are different from each other. Not only is this design of a sensor device very complicated it requires precise deduction of the spots at which the sensors are to be placed. Since noise signals may emanate from unexpected sources such an arrangement becomes not only expensive but impractical in actually eliminating noise signals. Similar a plurality of piezoelectric elements have been suggested in U.S. Pat. No. 4,835,436 in which is provide a sensor comprising a noise cancelling means, which cancels noise and extracts refined signals by combining two signals respectively generated by a first Piezo electric element with high signal to noise ratio and a second Piezo electric element with low signal to noise ratio. Again, U.S. Pat. No. 4,864,868 suggests two piezoelectric elements as strain transducers which are mechanically clamped adjacent to or into contact with the body where strain is required to be sensed.

Similarly U.S. Pat. No. 6,352,000 and other documents also discuss the use of two or more piezoelectric, capacitive or other elements in an attempt to noise cancellation.

Some other Existing flow meters have attempted to use complex signal processing electronics to extract the frequency signal from the overall sensor output signal. This approach is expensive, complex, and again has only had limited success.

Other flow meters and other measuring instruments such as stress and strain gauges have utilized a separate sensor to detect vibration. The output from this sensor is then subtracted from the overall signal to yield a better desired frequency signal. While this approach has been more successful, the configuration of these instruments have certain inherent disadvantages including that of being very expensive and delicate.

In the prior art probes for Sensors have a flexurally stiff sensor vanes. However, the vanes transmit noise signal along with the required signal and hence this is the main cause of the signal to noise ratio being poor.

In addition, the openings provided in the wall of the measuring tube allow cross flow of fluid effectively weakening of signal takes place. Also, the K factor cannot remain constant over the entire range of flow rates. The wall of the opening becomes weak since the sensor has to be close to the internal wall of measuring tube (pipe).

In tackling noise signals the hitherto approach has been that receiving these noise signals in the sensor element or elements is inevitable and the induced noise signal is filtered out by filtering means or complicated digital signal processing means is used to separate the noise signal from the desired signal. Following this approach inevitably, lower frequency signals go unattended reducing the sensitivity of the instrument and that of the measuring technique as a whole.

OBJECT OF THE INVENTION

An object of this invention is to provide a sensor device for flow meters and like instrument which is able to sense the desired signal and in the arrangement of which extraneous noise signals are prevented in a single sensing element itself without the need for providing additional sensing elements or using complicated means for separation of noise signals from the output signals.

Another object of this invention is to provide a sensing element for a sensor device which itself acts a filter for filtering out noise signals.

Still another object of the invention, is to provide a robust sensor device which can be used for detection and measuring a wide variety of varying force pulse signals, such force being generated by pressure, vibration stress or strain.

Still another object of this invention is to provide a sensor device that compensates for flexular noise waves, common mode noise waves, transmitted through the housing of the device.

Yet another object of this invention is to provide a sensor device which takes into account the reactions of the system pressures, effects of medium including its natural frequency and the natural frequency of the components of the sensor device in the design of the sensor device.

STATEMENT OF INVENTION

According to this invention there is provided a sensor device for measuring frequency and amplitude of a varying force signal the sensor device, consisting of:

i) a sensing element defined by a plurality of even numbered planar segments symmetrically disposed about a central axis, each of the segments being responsive to the frequency and amplitude of said varying signal and ambient noise signals associated with the said varying signal, the said segments connected in pairs to each other about the said central axis, such that the segments form discrete sets, said sets responding equally in magnitude but opposite in direction to the said noise signal and said sets responding differentially to the said varying signals to generate noise cancelled output signals, proportionate to the frequency and amplitude of the said varying signal;

ii) protective housing for housing the said sensing element, the said housing defined by side walls, an operative base and cover, the said sensing element being fitted to the base of housing;

iii) interface element comprising:
  a) a pick up member for picking up the said varying signals, the said pick up member being centrally disposed with respect to the said central axis of the said sensing element;
  b) a planar mechanical actuator adapted to deform in response to the said varying signal, the said actuator cooperating with the sensing element;
  c) a transfer member adapted to receive varying signals from the pick up, amplify the signals picked up and transfer the amplified signals to the said mechanical actuator; and iv) leads for transmitting said output signals outside the sensing device for processing.

Typically, the sensing element is selected from a group of elements consisting of a piezo electric element, a capacitive element, an inductive element, a variable reluctance element, a piezo resistive element, an optical element, a piezo electric PVDF film element, quartz element, piezoelectric crystal element, Gallium Ortho-phosphate Element, a magnetic element, Magneto strictive element, and an eddy current type sensing element.

The shape of the sensing element is selected from a group of element types consisting of a Round Disc, an Oval disc, a Rectangular plate, a disc of geometric shape, a disc of non-geometric shape, a Disc of Optical Fiber cluster, Stack of any one of the aforesaid element types, bodies having an operative planer surface.

The segments are formed on the Sensing element with non sensing segment spaces therebetween or the segments are assembled together with non-sensing spaces between to form the said sensing element.

In accordance with one embodiment of the invention the segments are internally connected to form pairs. Alternatively, the segments are externally connected to form pairs.

The sensing element is fitted to the base of the housing by a method selected from a group of methods comprising adhesive bonding, brazing, soldering, welding, clamping, screwing, riveting and encapsulation.

The pick up element is selected from a group of elements consisting of the following element types: vane, tapered wedge, Ball, Inverted cone, cylindrical Rod, fin plate, spindle hollow pipe, and Bluff body.

The Interface element is preferably integral with operative base of the said Housing.

Alternatively, only the mechanical actuator Member of the Interface Element is integral with the operative base of the said housing or the Pick Up Member and the Transfer member of the Interface element are integral.

The actuator element may itself be the sensing element and the segments may be formed, typically by vacuum deposition or printing on the actuator element either in a single layer or in multi-layers with insulation layers in between to form a stack of sensing elements.

Alternatively, the segments may similarly be formed by printing or vacuum deposition on the operative base of the housing.

In accordance with a preferred embodiment of this invention the transfer member and the mechanical actuator are related to each other such that they satisfy the following condition:

$$1000 \geq \log [dX\phi/Y_0] \geq \log(0.2718)$$

where d=effective diameter of the transfer member of the interface element;

φ=deflection in radians of the transfer member/pick up assembly when subjected to the force pulse of the varying signal; and $Y_0$=center deflection of the mechanical actuator when subjected to the pressure within the system in which the sensor device is placed.

In accordance with another preferred embodiment of this invention the operative base of the housing is provided with a recess and the said mechanical actuator of the transfer member is provided within the said Recess.

Alternatively, the said Mechanical Actuator of the Interface Element is formed in the operative base of the said Housing.

The transfer Member may be in the form of a uniform rod, pipe or tube or a non-uniform rod, pipe or tube, and at least a portion of the Transfer member lies in an axis perpendicular to the said central axis of the said Sensor Element. Again preferably, the transfer element is fitted centrally to the said mechanical actuator and extends centrally with respect to the said central axis in a direction perpendicular to the said central axis.

The actuator is fitted to the said Operative Base of the housing by a process selected from a group of processes, which includes bonding, adhesive bonding, brazing, Soldering, Welding, Clamping, Screwing, Riveting and encapsulation vacuum deposition and screen printing.

This invention also extends to an instrument for detection and measurement of flow of fluids or an instrument for monitoring and measurement of vibrating force, stress or strain associated with a machine having a sensor device in accordance with this invention fitted therein.

BRIEF DESCRIPTION OF THE DRAWINGS

The invention will now be described with reference to the accompanying drawings, in which.

DETAILED DESCRIPTION OF THE PREFERRED EMBODIMENTS IN RELATION TO THE DRAWINGS

Figure 1:
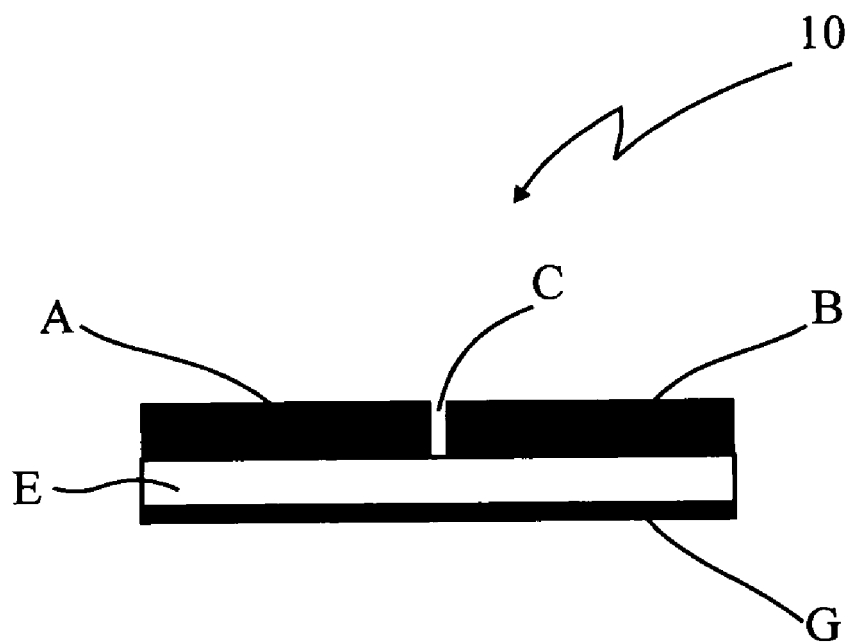
FIG. 1 is a typical disc type sensor element of the prior art.
Figure 2A:
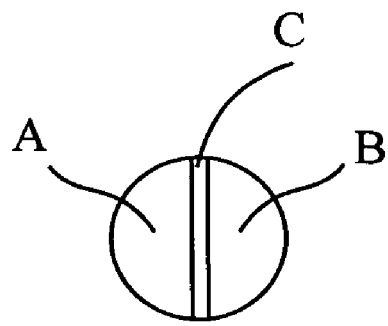
FIG. 2a is a plan view of the sensor and FIG. 2b is the typical circuit representation of the sensor element of FIG. 1.
Figure 2B:
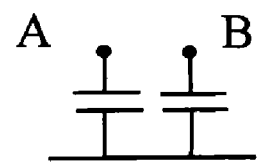

Referring to the drawings, FIGS. 1 and 2 shows schematically a piezoelectric element used for sensing devices in the prior art.

The sensing element shown in FIG. 1 consists of typically two semicircular halves A and B of a Piezo electric disc generally indicated by the reference numeral 10 divided by a plane including the non sensing space C and provided on a ceramic substrate E with the reference electrode G on the bottom surface of the substrate E. The electrodes A and B are alternatively compressed by oscillatory impulses acting on them. The two semicircular halves of the Piezo electric disc 10 with reference to the reference electrode are represented by the electric circuit representation in FIG. 2b.

Figure 3A:
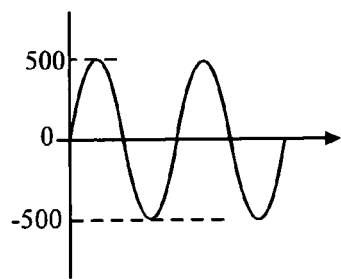
FIGS. 3(a) and (b) represent the output signals generated by each segment of the sensor element of FIG. 1.
Figure 3D:
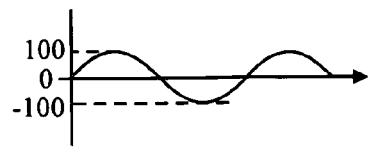
FIGS. 3(d) and 3(e) represent the noise output signal sensed and generated by each of the segments of the sensing element of FIG. 1.
Figure 3B:
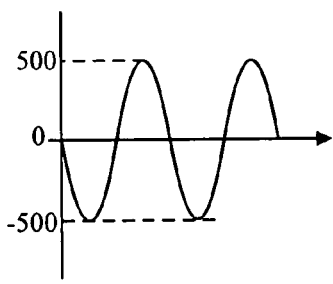
FIG. 3(c) represents the effective output signal of both segments of the sensor element collectively without taking into account any noise signal.
FIG. 3(f) represents the collective noise signal generated by the sensing device.
FIG. 3(g) represents the effective signal generated by the sensing element taking into account the noise signal.
Figure 3E:
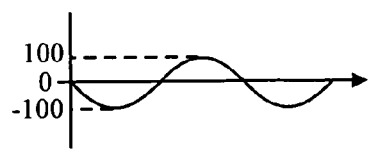
Figure 3C:
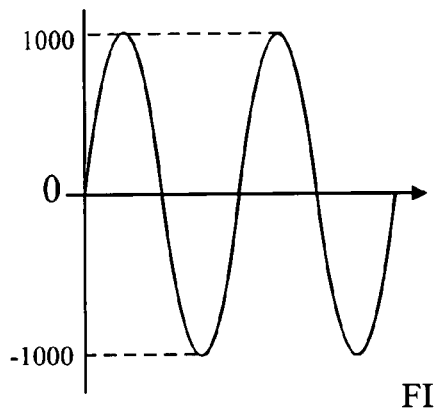

The output signals in response to a measurand are graphically represented in FIG. 3(a), 3(b) and 3(c) in which FIG. 3(a) represents the output signals of electrode A to a measurand, 3(b) represents the output signals of electrode B to the measurand, and 3(b) represents the combined output signal of both electrodes A and B to the measurand, the measurand being the physical property or condition being measured or detected, typically varying force pulse signals.

Figure 3F:
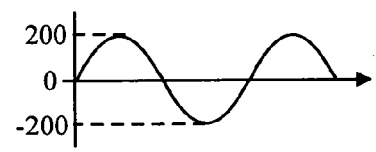
Figure 3G:
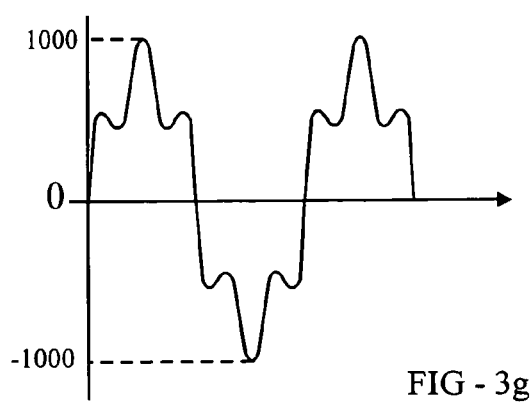

FIGS. 3(d), and 3(e) represent the output signals of the electrodes A and B to ambient noise. The regularity of the curve has been exaggerated. In reality the noise signals are relative irregular. FIG. 3(f) represents the net effect of the noise signals of both electrodes A and B. Finally FIG. 3(g) is the actual output signal of electrodes A and B distorted as a result of the effect of the noise signal superimposed on the output signal. This distorted output signal causes a lot of problems in the detection an monitoring of varying signals such as in flowmetery particularly in low frequency ranges and where the signal to noise ratio is low and sometimes makes measurement impossible or difficult.

What is envisaged is a sensing element 100 in accordance with this invention as seen in FIGS. 4, 4(b), 5, 6, 7, 8, 9, 10, 11 and 12. In which the sensing element is divided into or formed from segments evenly located on either side of a central axis "Y". In the figures these segments are designated by the reference numerals 1, 2, 3, 4, in FIGS. 4, 4(a), 4(b), 7, 8, and 10, and reference numerals 1, 2 3, 4,5, 6 7 and 8 in FIGS. 9, 11 and 12.

Figure 5:
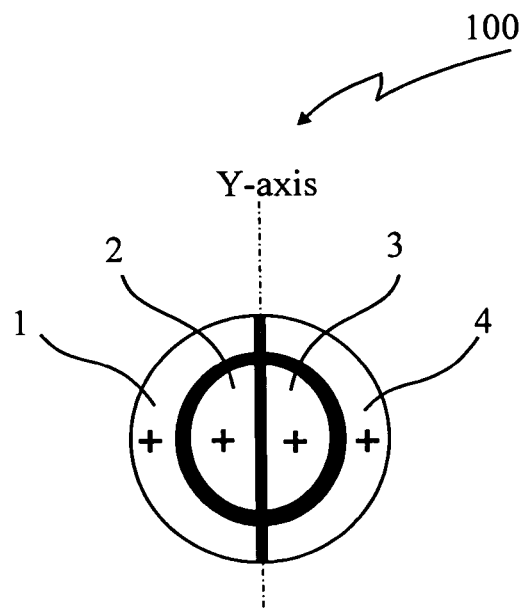
FIG. 5 is the sensing element of FIG. 4 in which all the segments have the same polarity.
Figure 6:
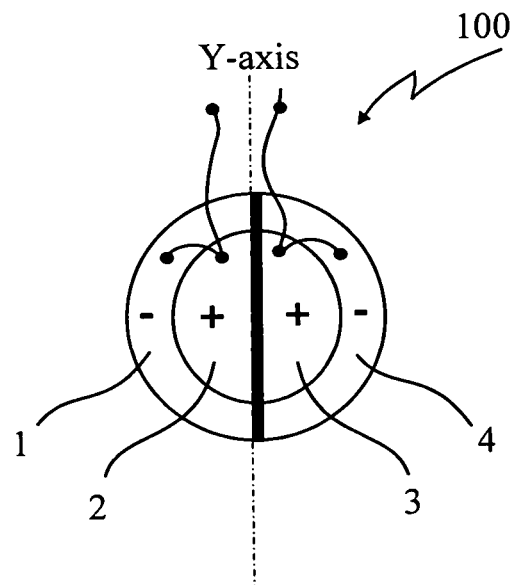
FIG. 6 shows the sensing element of FIG. 5 showing segments of different polarities.

It has been found that if a varying force pulse signal is applied to the sensing element voltage or charge is produced in the sensing element on each of the segments. Segments which are closer to the central axis Y generate greater voltage or charge as compared with segments away from the central axis. Thus segment 1 will generate a lesser voltage than segment 2 and segment 4 will generate a lesser voltage than segment 3 with reference to the reference electrode 'Ref'. However, in the case of noise signals which are transferred through a housing of the sensor element and impinge on the sensing element as longitudinal and/or transverse waves, the vibrations of the waves cause the individual segments to generate equal voltages or charge irrespective of the location of the segments from the central axis "Y". The polarities of individual segments can also be controlled. As seen in FIG. 5 all the segments 1,2,3 and 4 can be polarized positively or alternatively as seen in FIG. 6 the polarities can be alternatively positive or negative.

Figure 4:
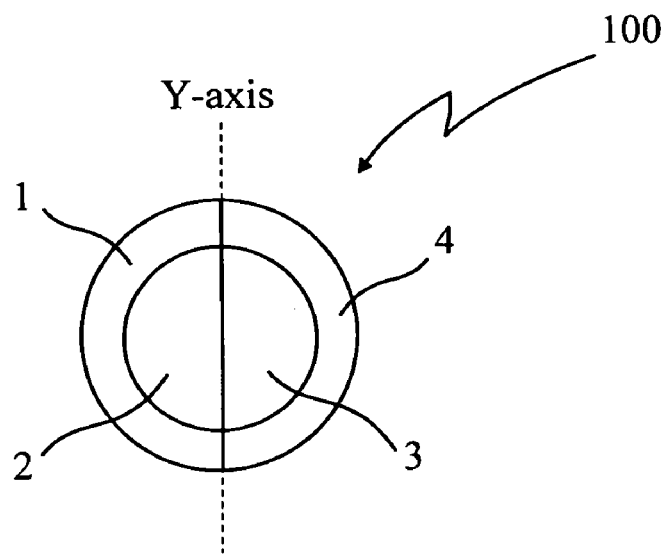
FIG. 4 is a typical sensing element envisaged in accordance with this invention.
Figure 4A:
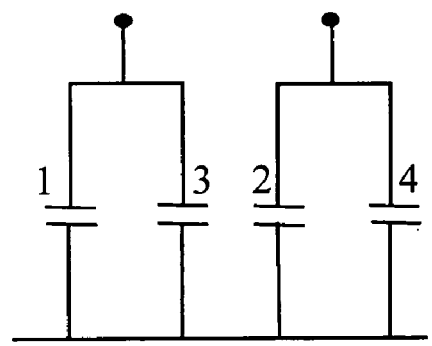
FIG. 4a is the typical circuit representation of the sensor element of FIG. 4.
Figure 4B:
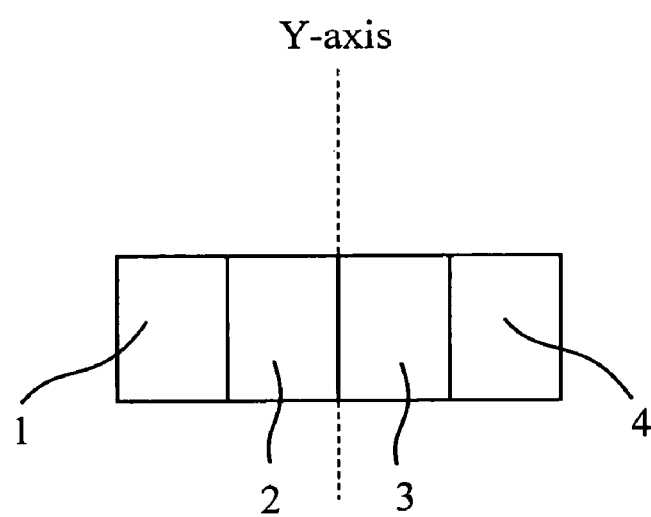
FIG. 4(b) is a an alternative embodiment of the sensing element of FIG. 4.
Figure 5A:
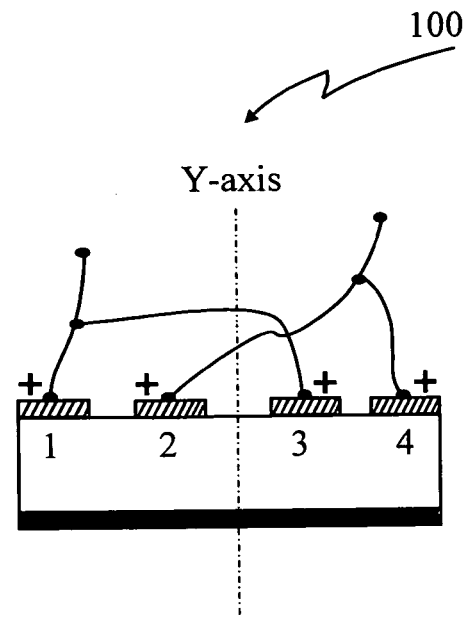
FIG. 5(a) shows the method of forming pairs of segments around the central axis for the sensing element of FIG. 5.
Figure 6A:
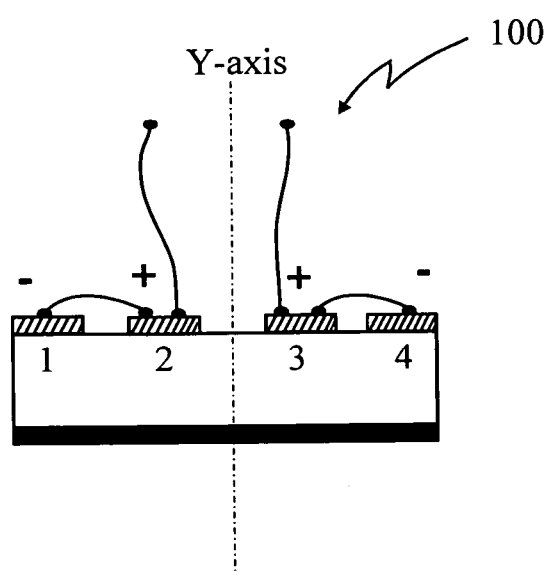
FIG. 6(a) shows the method of forming pairs of segments around the central axis for the sensing element of FIG. 6.
Figure 14A:
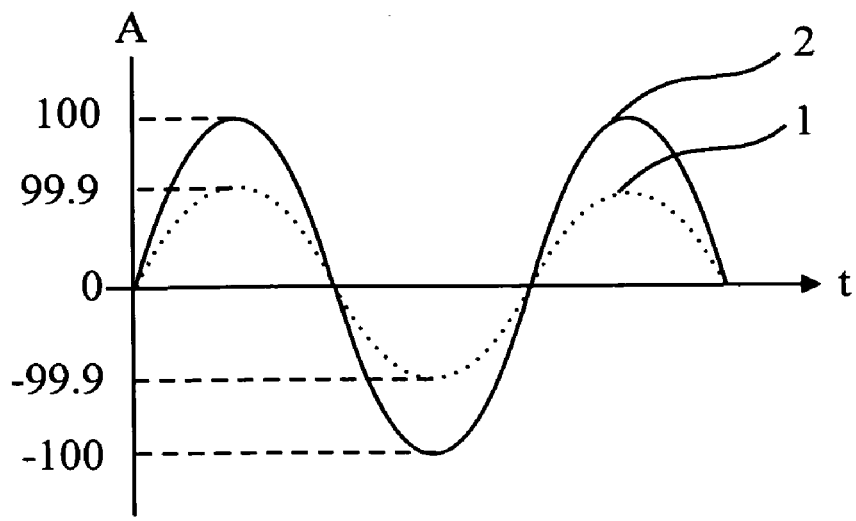
FIGS. 14(a) and 14(b) show the noise signal output for the two pairs of segments respectively in accordance with this invention
Figure 14B:
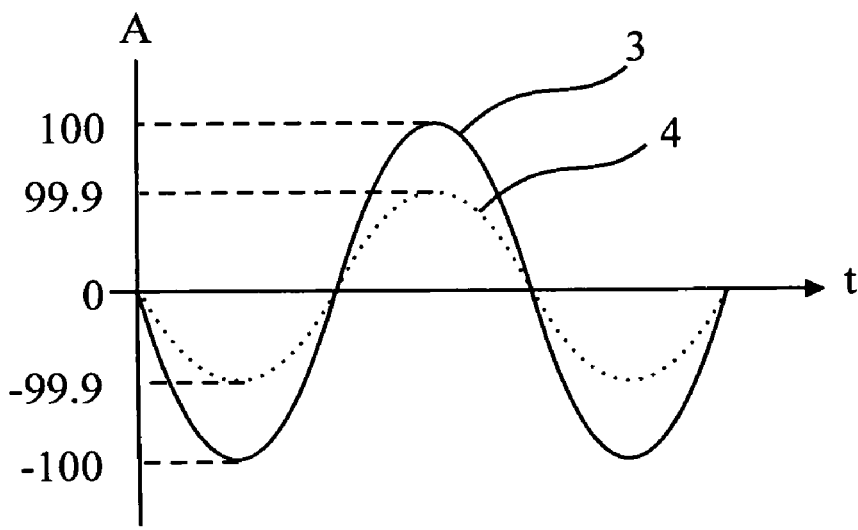
Figure 14C:
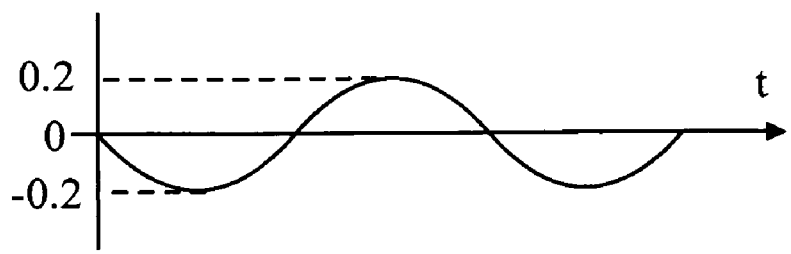
FIG. 14(c) shows the effective noise signal after cancellation across the pair of segments of the sensing element.

Now if as seen in FIG. 5(a) if segments 1 and 3 are connected and segments 2 and 4 are connected to form pairs two phenomena occur: the combined effect of the differential signal between segments 1 and 3 connected electrically and forming a pair and 2 and 4 connected electrically and forming a pair causes an applied signal to be available from the connection which is proportionate in frequency and magnitude to the signal to be measured. This electrical connection representation is seen in FIG. 4(a) However in the case of noise signals since the signals are approximately equal a subtraction effect takes place and the noise signal gets cancelled. These two phenomena are graphically illustrated in FIGS. 13 ans 14. In FIGS. 13(a), 13(b), 13(c), and 13(d) show the output signals for the segments in the case of 4 segments 1, 2, 3 and 4 individually in FIG. 13(a), with respect to the reference signal, the output as a result of the combined effect of segments 1 and 3 with respect to the reference seen in FIG. 13(c), the output as a result of the combined effect of segments 2 and 4 with respect to the reference seen in FIG. 13(b) and the differential effect between the outputs of 1 and 3 connected in a pair and 2 and 4 connected in a pair as seen in FIG. 4a the output as a result of the combined effect of segments with respect to the reference seen in FIG. 13(d). The effect of the noise signal is illustrated in FIGS. 14(a), 14(b) and 14(c). For graphical representation the sensing element shown in FIG. 5 is considered and although the voltages generated as a result of noise are approximately equally for graphical illustration purposes and for understanding the subtraction effect they are exaggerated. FIG. 14 (a) considers the effect of the noise signal in segments 1 and 2 and FIG. 14 (b) the effect of the noise signal in segments 3 and 4. When segments 1 and 3 are connected and segments 2 and 4 are connected and the differential output is taken across the two pairs the net result will be subtraction of the noise signal to insignificant levels as dramatically illustrated in FIG. 14(c). For the purposes of the noise signal one member of the pair acts as a sensing segment the other segment acting as the feedback segment and the overall differential signal between the pairs resulting in a percentage feedback signal. In case the segments are polarized alternatively then the connections will be as seen in FIG. 6(a).

Figure 7:
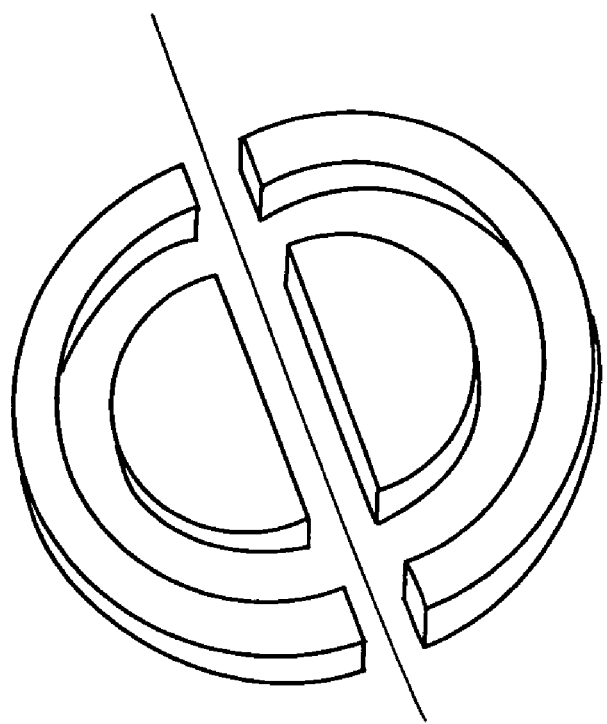
FIGS. 7 and 8 show a variations of sensing elements having segments which are assembled together.
Figure 8:
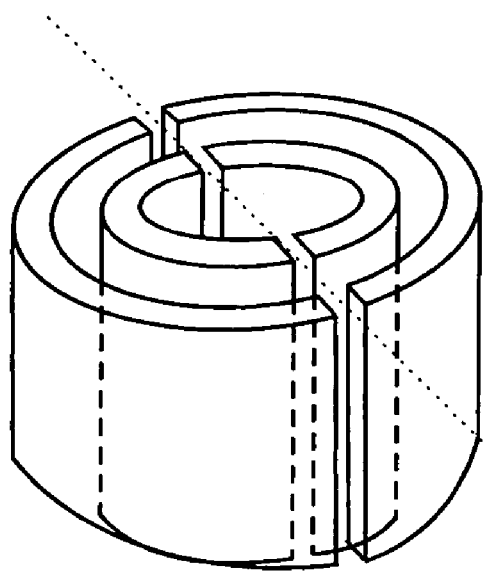
Figure 9:
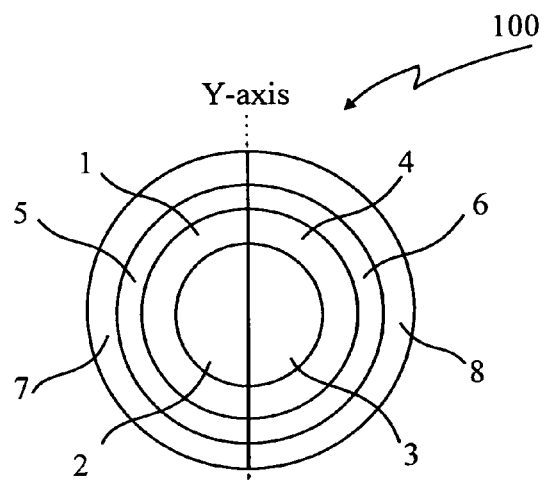
FIG. 9 shows a variation of the sensing element showing segments with 2 pairs of segments on either side of the central axis respectively
Figure 10:
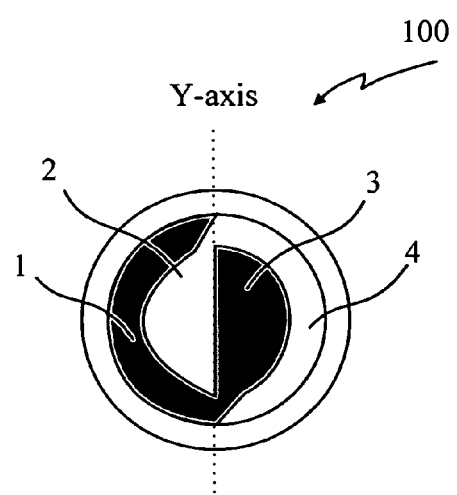
FIGS. 10 and 11 show a variation of the sensing element where the segments are internally connected.
Figure 11:
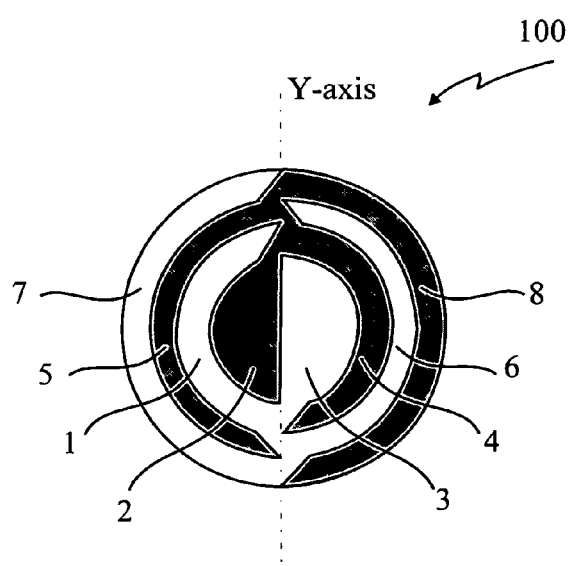
Figure 12:
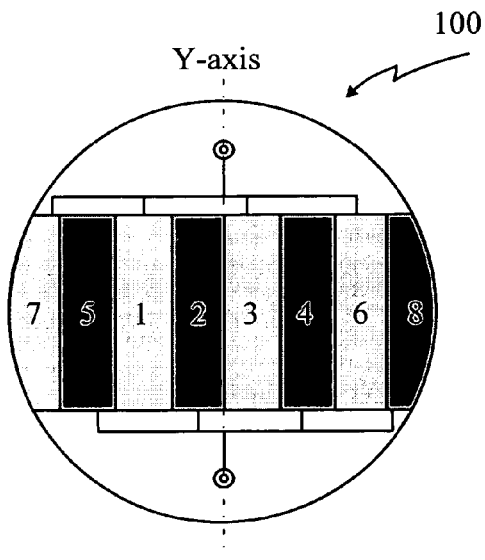
FIG. 12 shows another variation of the sensing element where only a portion of the disc is used for forming segments.
Figure 13A:
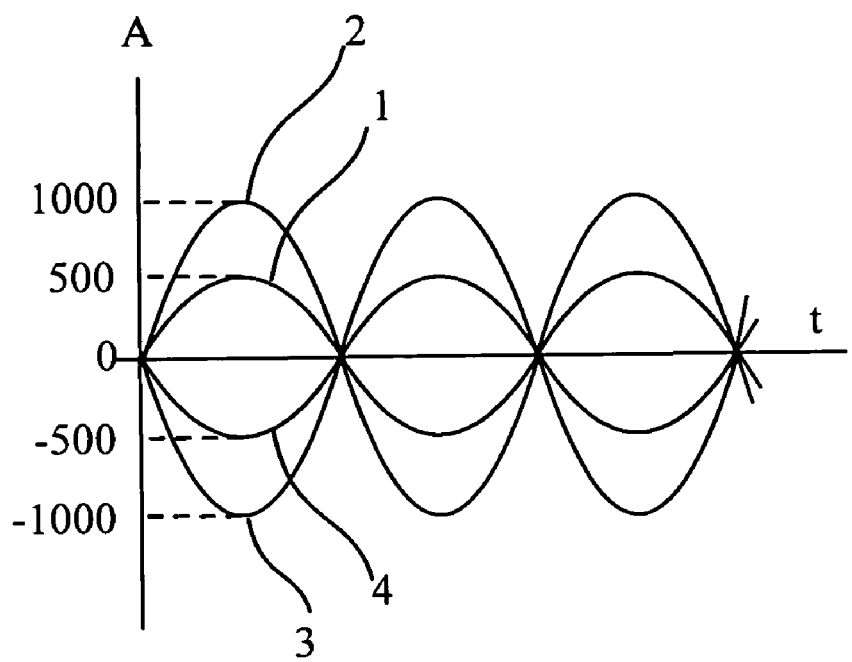
FIGS. 13(a), (b), (c) and (d) show the changes in the sensed varying signal for the basic 4 segmented sensing element in accordance with this invention corresponding to each of the segments, one pair of segments, the other pair of segments and the differential signal between the two pairs respectively.
Figure 13B:
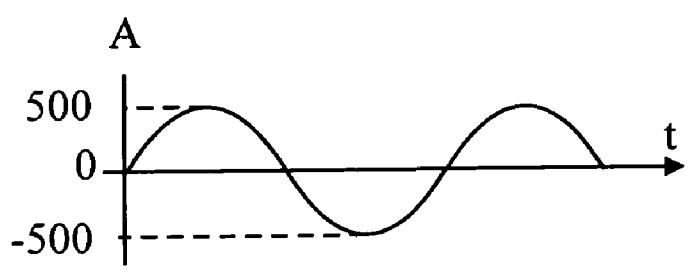
Figure 13C:
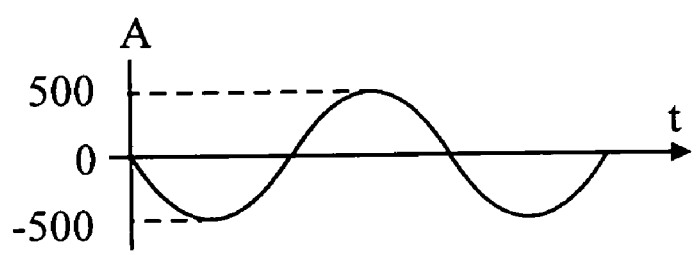
Figure 13D:
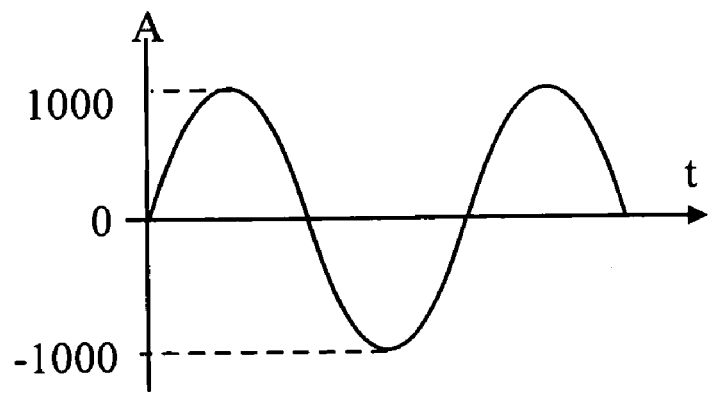

The segments can be formed on a ceramic disc by a suitable process by a person skilled in the art by a deposition or a printing process creating the sensing zones and the non sensing zones to form the segments. The segments can be internally connected as seen in the FIGS. 10 and 11 or externally connected as seen in FIGS. 5(a), 6(a) and 12. In accordance with an alternative embodiment of the sensing element, the elements can be formed by assembling together preformed segments as seen in FIGS. 7 and 8. One advantage of the assembling step is that the heights of the segments can be adjusted to precisely control noise signals. FIGS. 9 and 11 and 12 show sensing elements with more than two pairs of segments connected in sets to form the sensing element. In theory, the sensing element could be divided into several pairs of segments evenly disposed on both side of the central axis. Greater the number of segments greater is the precision with which the noise signal can be controlled. The noise is adjusted by fine tuning the feedback level.

Disturbances due to increase or decrease in Temperature are treated the same was as physical noise. Temperature affect all the segments and temperature is therefore considered as a noise signal which is in phase and equal in amplitude for all the segments. It is therefore considered as a common mode noise signal and cancelled completely.

Although the sensing element segments has been described for piezoelectric sensing segments. The segments could as well be a capacitive element, a piezo resistant element, an optical element, a piezo electric PVDF film element, quartz element, piezo electric crystal element, Gallium Ortho-phosphate Element, Magneto strictive element, magnetic element, inductive element, a variable reluctance type element and an eddy current type sensing element.

For instance, instead of piezo electric sensing element, the element can be made of optical fiber segments having reflective ends. The deformation of the mechanical actuator in response to flow or strain causes a beam of light which is guided through the fiber to be displaced. The light beam is periodically reflected back along the axis of the fiber. These periodic alterations of the intensity or phase of the reflected beam is detected by a an interferometer or a photo detector and turned into a series of electrical pulses which can be detected and measured.

In case of some of the other type pf elements, such as the inductive or the piezo resistive types, or strain gauge elements, separate output leads are taken out from each of the segments and connected to an external signal conditioning apparatus which electronically adds or subtracts the signals to get a proportional noise free output signal.

The shape of the sensing element can be preferably a Round Disc. However other shapes such as an Oval disc, a Rectangular plate, a disc of geometric shape, a disc of non-geometric shape, a Disc of Optical Fiber cluster, Stack of any one of the aforesaid element types, bodies having an operative planer surface are within the scope of this invention.

In the case of a stack a plurality of discs are stacked together preferably having their sensing axis parallel to each other. The stacks may be formed with discs facing each other to form contacted conductive pairs or in a series array and a strategically placed segments are connected to form pairs. The charge generated is independent of the dimensions of individual segments but the total charge generated will be multiplied by the number of discs connected in parallel since forces act simultaneously on all the discs.

The sensing device envisaged in accordance with this invention can now be designed keeping in mind certain theoretical and mathematical conditions and calculations that are explained with reference to FIGS. 15, 16 and 17.

The sensing device in accordance with this invention in addition to the segmented sensing element also must be constituted by

[1] a protective housing for housing the said sensing element, the said housing defined by side walls, an operative base and cover, the said sensing element being fitted to the base of housing;

[2] an interface element comprising:
  a) a pick up member for picking up the said varying signals, the said pick up member being centrally disposed with respect to the said central axis of the said sensing element;
  b) a planar mechanical actuator adapted to deform in response to the said varying signal, the said actuator cooperating with the sensing element
  c) a transfer member adapted to receive varying signals from the pick up, amplify the signals picked up and transfer the amplified signals to the said mechanical actuator; and

[3] leads for transmitting said output signals outside the sensing device for processing.

Figure 16:
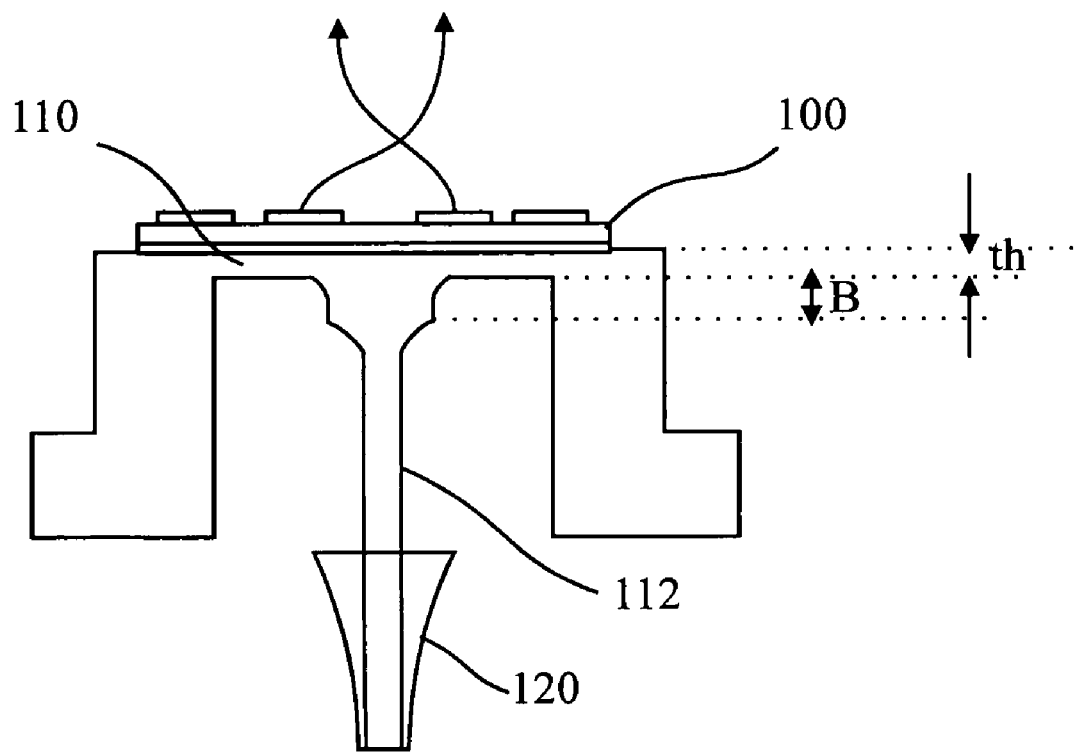
Figure 17:
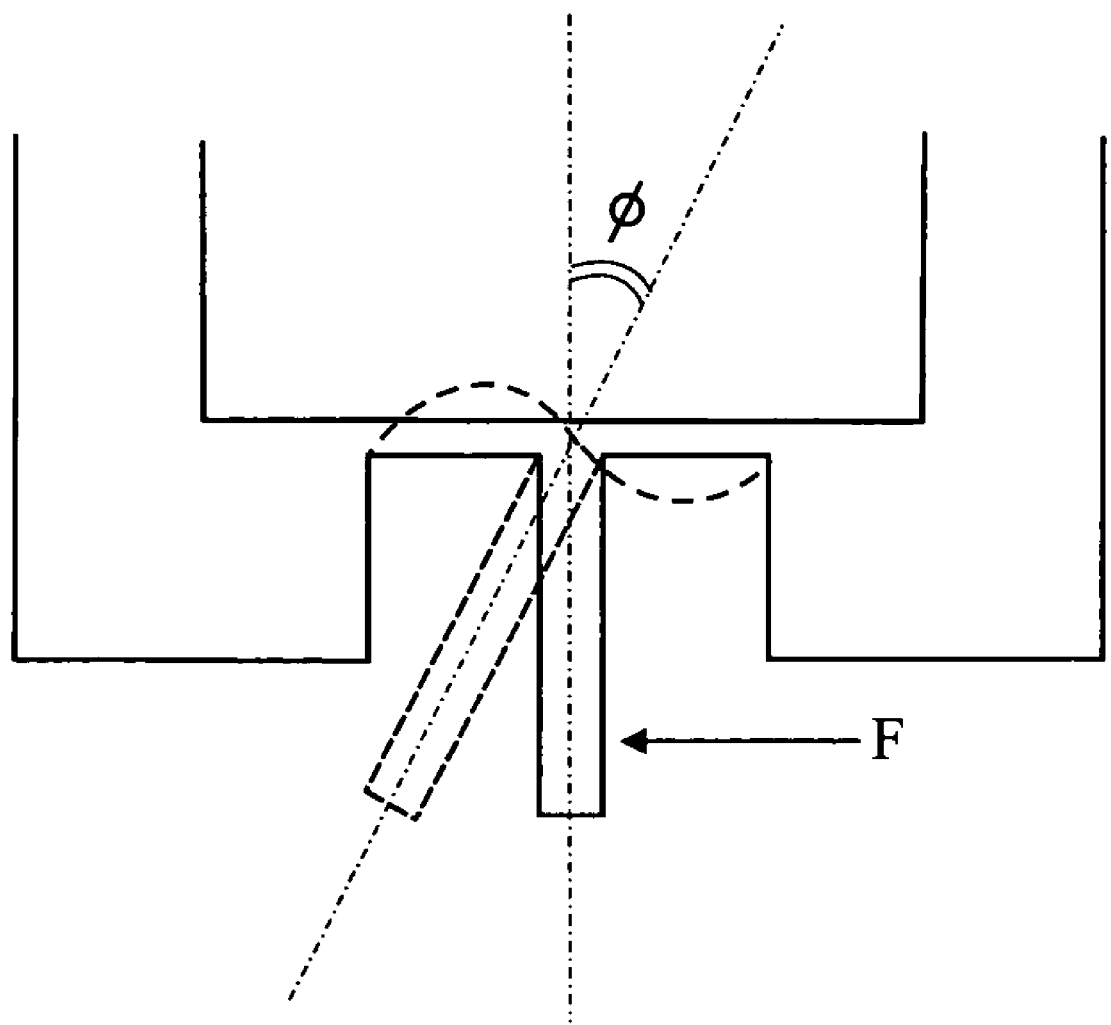

General reference may be has to FIG. 16 which illustrates the association of the interface element with the sensing element 100 in accordance with this invention. The interface element is constituted by the mechanical actuator in the nature of diaphragm 110 to which the sensing element 100 is attached. The diaphragm 110 is connected to a signal pick up 120 via a transfer member 112. The transfer member 112 lies in an axis perpendicular to the said central axis "Y" of the said Sensor Element 100 as seen in FIG. 5 and other figures.

The inventor has found that best noise free signals with good overall sensitivity for the desired force pulse signal is achieved when the interface element is designed keeping in mind certain parameters. This must include the fact that the stiffness of the mechanical actuator is affected by the system pressure acting on the diaphragm—mechanical actuator. This system pressure, for instance this system pressure in the case of fluid flow will be analogous to the static fluid pressure is generally several thousands of time greater than the varying pulse force signals that the sensor device in accordance with this invention is designed to measure and this must be taken into account in the design. If the effective diameter, which is diameter d of an imaginary circle enclosing the largest section of the transfer member 112 [as seen in FIG. 15] [which may be typically be the region connecting the transfer member to the diaphragm and in practice may be an integral portion of the transfer member or the diaphragm itself] and $Y_0$ is the central deflection=CF of the center of the diaphragm 110 due to the system pressure Sfp [see FIG. 15] and $\phi$=the deflection in radians as a result of the F to be measured on the transfer member [see FIG. 17] Then the dimensions of the diaphragm i.e. the mechanical actuator 110 and the transfer member 112 is maintained such that $$1000 \geq \log [dX\phi/Y_0] \geq \log(0.2718)$$

Also if the thickness of the diaphragm is 'th' and the width of the boss forming the region where the diaphragm is connected to the transfer member is B. Then B>5Xth.

Figure 15:
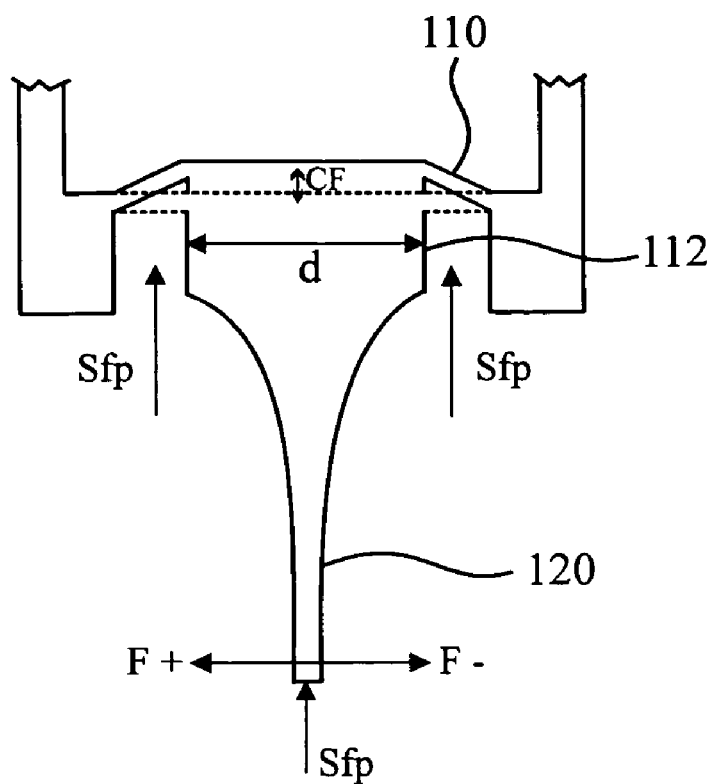
FIGS. 15, 16 and 17 represent the theoretical considerations involved in the construction of the interface element for transmitting the signal to the sensing element in accordance with this invention

The varying signal force F pulses to be measured or monitored are typically in a plane perpendicular to the system force Sfp [see FIG. 15]. A pick up member typically a vane type element 120 is provided which is generally perpendicular to the force F. The force F acts on the pick up 120. The force signals are then transferred to the transfer member 112. Under the influence of the force F the transfer member including the region B tends to oscillate. This oscillation deflects the mechanical actuator diaphragm 110 to be deflected as seen in FIG. 17 as a result of pressure fluctuations. The pressure fluctuations acting periodically on the mechanical actuator diaphragm 110 lead to a resilient deformation of the mechanical actuator which is propagated to the sensing element 100 cooperating with the mechanical actuator. During deformation, the segments deliver electric pulses to the leads contacted by the segments which are lead out of the sensor for processing typically to be converted by suitable electronic means into a flow velocity and subsequently into a volumetric flow [in the case where the sensing device of this invention is used as a sensor device of a flowmeter.

Figure 18:
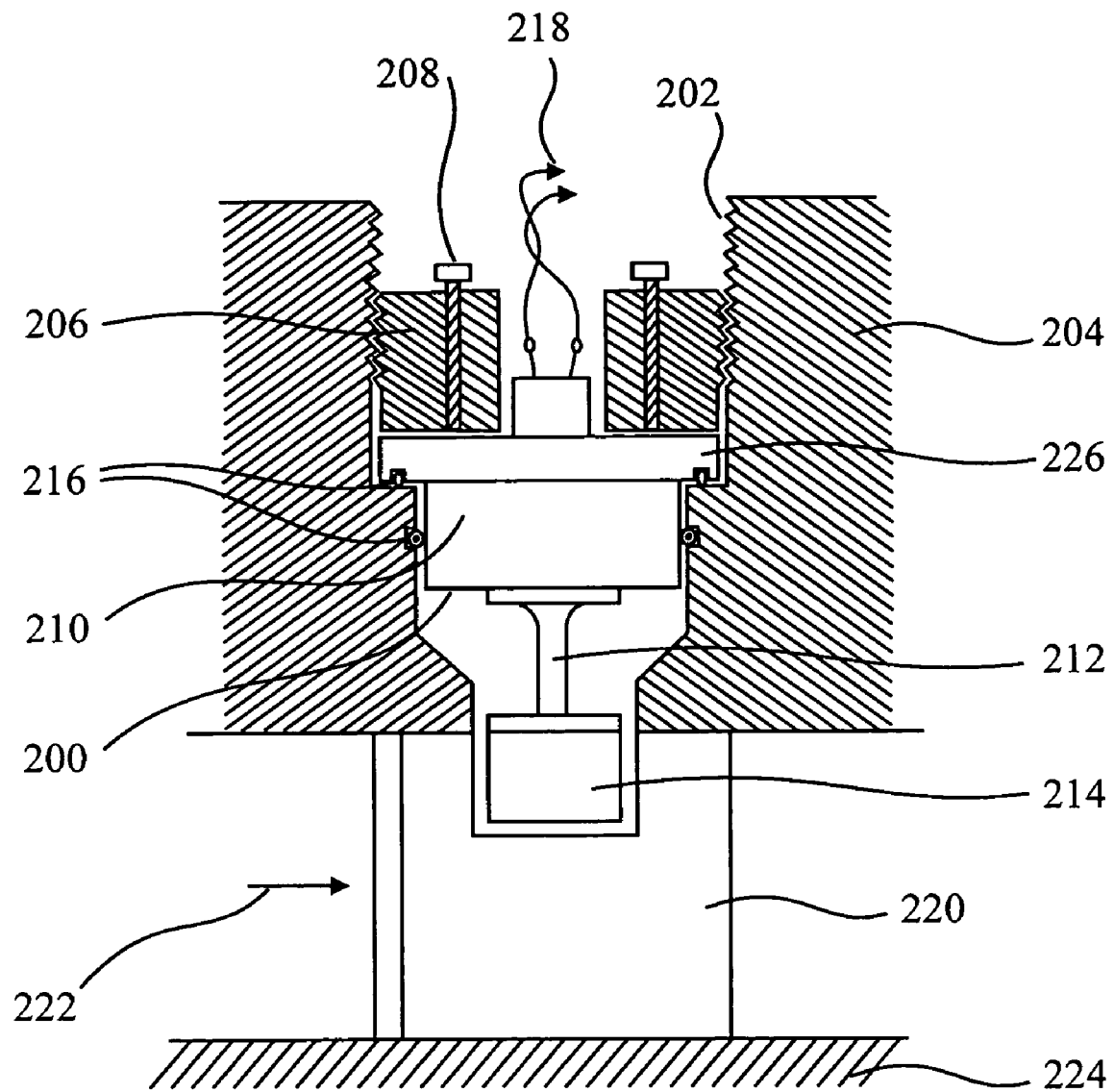
FIG. 18 shows a partial sectional of the sensor device in accordance with this invention as fitted in a typical flow meter.

FIG. 18 is a flow meter assembly showing the use of the sensor device 200 in accordance with this invention. The flow meter shown in FIG. 18 is a bluff body type vortex shedding flow meter in which the sensor device 200 is used. The sensor device 200 is provided in a threaded recess 202 of the instrument body 204. The senor device is held in place by a threaded holder 206 by means of screws 208. The sensor device 200 consists of a housing 210 which houses the sensing element 100 [not shown in FIG. 18] having a cap 226. The interface element consists of the transfer member [212,228] from which extends the pick up member 214.

Suitable O rings for sealing purposes and locator rings 216 are provide for locating and sealing of the sensor device 200 in the recess 202. Leads 218 are provided which extend from the sensing device 200 and connect to the segments of the sensing element within the housing. The sensor device 200 cooperates with the bluff body 220 placed in the direction of fluid flow marked by the arrow 222 in the conduit 224.

Figure 19:
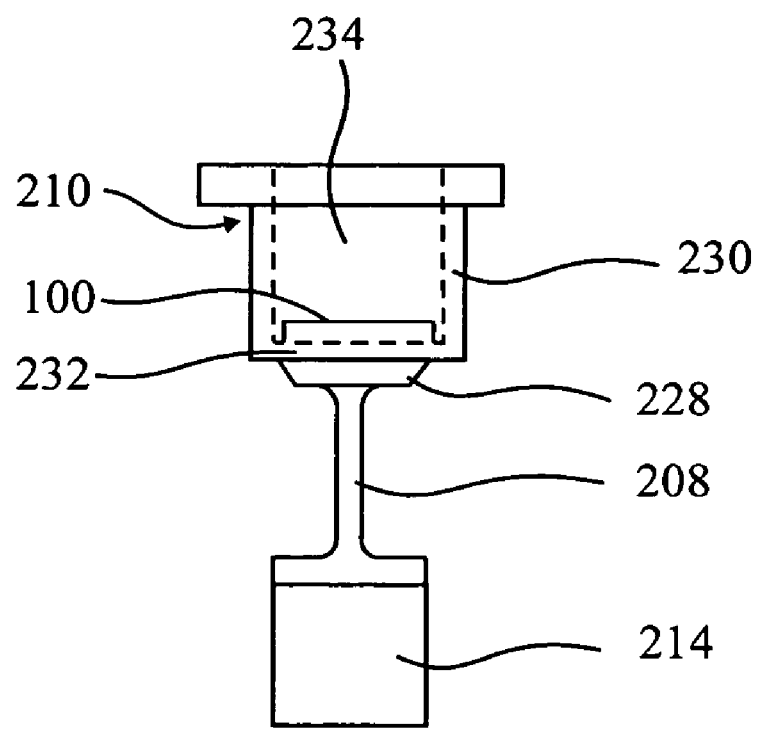
FIGS. 19 and 19(a) shows the configuration of a typical housing and interface connection for the sensor device of FIG. 18.

The details of the housing for the sensor device is shown in FIG. 19. In the variation shown in FIG. 19. The interface element which cooperates with the sensing element 100 consists of the mechanical actuator diaphragm which in this case is the operative base 232 of the housing 210 which has side walls 232 and a recess 234 in which the sensing element is located. This is connected to the transfer member which is shown as the boss 228 and the rod 212 and the pick up member 214. The pick up element 214 is selected from a group of elements consisting of the following element types: vane, tapered wedge, Ball, Inverted cone, cylindrical Rod, fin, plate, hollow pipe, and a Bluff body. It may extend from the rod 208 of the transfer member or may be integral with the rod 208. The boss 228 again may be integral with the rod 208 or may be integral with the operative base of the 232 of the housing 210. It is also envisaged in accordance with a preferred embodiment of this invention that the housing, the mechanical actuator and the transfer member and the pick up member may be machined from one piece metal such as stainless steel. This considerable improves the rigidity of the design.

Figure 19A:
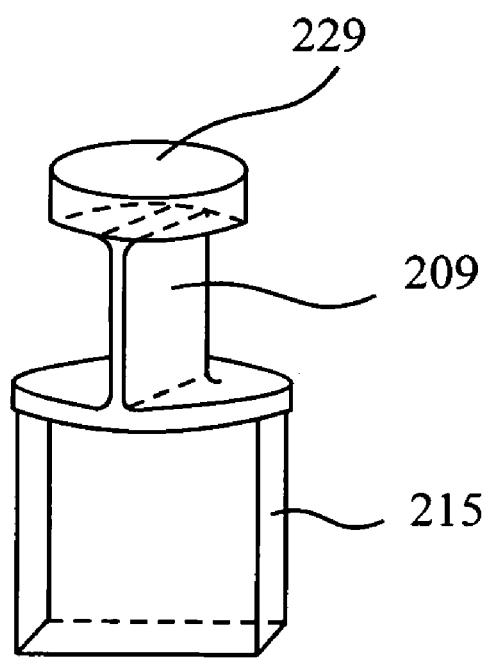

The sensing element 100 is fixing to the mechanical actuator i.e. the base of the housing. This fixing is achieved by any one or more of the methods such as adhesive bonding, brazing, soldering, welding, clamping, screwing, riveting and encapsulation. FIG. 19(a) shows one variation of the transfer member and the pick up member of interface element. The transfer member consists of the boss 229 and the plate 209 and the pick up member is the plate 215. The boss 229 is welded to the base [not shown] of the housing of the sensor device.

Figure 20:
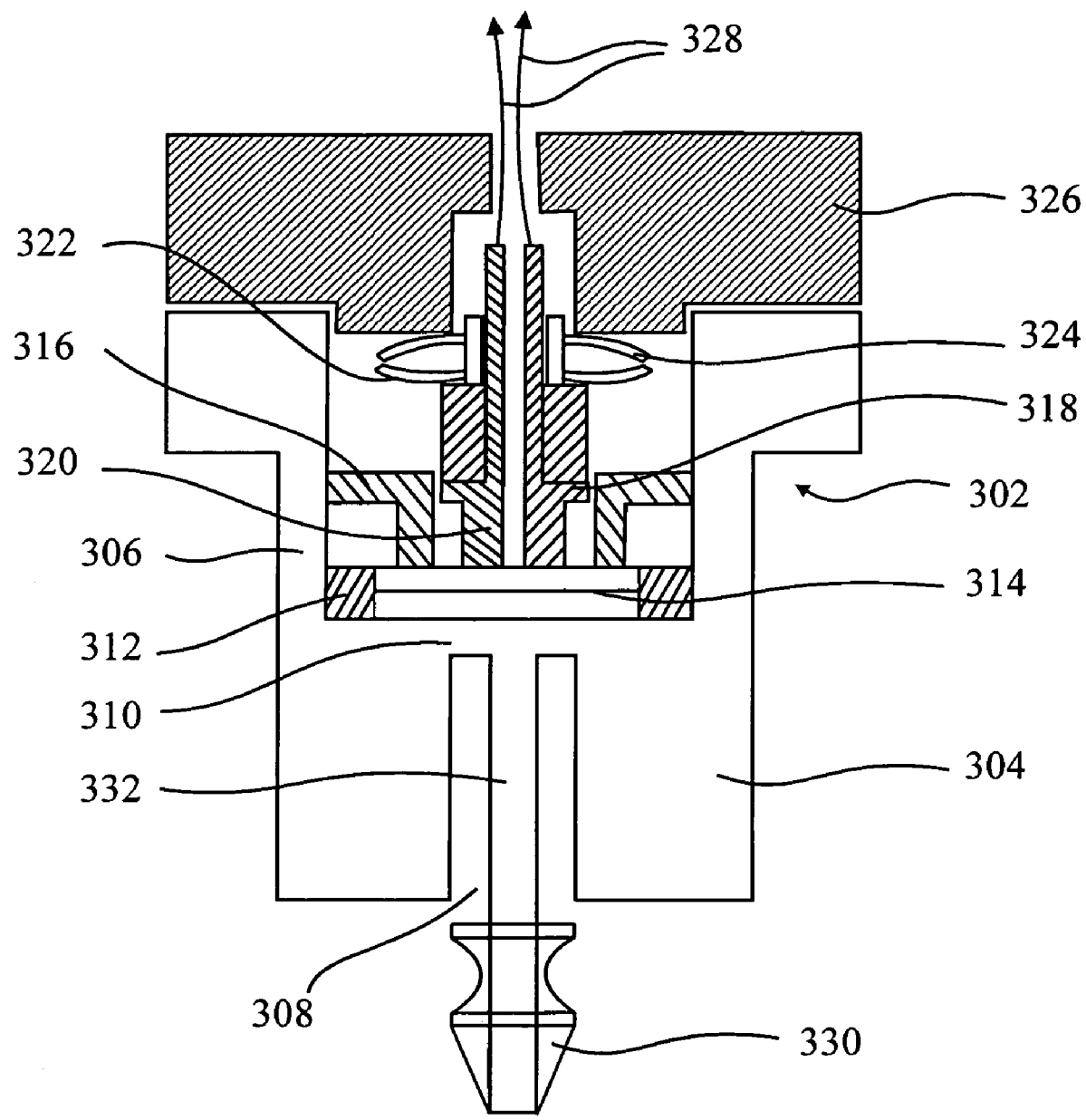
FIG. 20 shows an alternative variation of the sensor device where the sensor element is clamped in the housing.

FIG. 20 shows the use of a sensor device 300 in accordance with this invention for high pressure and high temperature application greater than 300 degrees Celsius. In FIG. 20, the housing body 302 has a thick operative base 304, side walls 306 and a recess 308 in the base 304 through which the interface element is inserted. The thick base and narrow recess formation protects the sensing element from the heat and system pressures. Dampening means [not shown] in the form of an O ring may be provided in the recess to control amplification provided by the Transfer element.

As seen in FIG. 20, the mechanical actuator is formed within the base and is the diaphragm 310, to which the sensing element 314 consisting of a stack of two discs is placed. A locator cum insulator holding ring 312 helps to locate the sensing element 314 and the press fitted sleeve 316 acts as a first clamp to fix the sensing element on to the base/diaphragm/mechanical actuator 310. Further clamping is achieved with the help of the electrodes 318 and 320 which are pressed on the sensing element by means of the deforming clip elements 322 and 324 and the pressure exerted by the cap/cover 326 for the housing 302. Leads 328 extend from the electrodes 318. Clamping of the sensing element becomes necessary when operating at high temperatures where bonding and adhesives will not survive the high temperatures. The pick up element 330 illustrated in the figure is spindle shaped and is not critical to the design and has been provided for showing the possible variation of the pick up element. The transfer member 332 is a rod integral with the base of the housing and the pick up member is shown fitted into the rod only by way of example.

Figure 21:
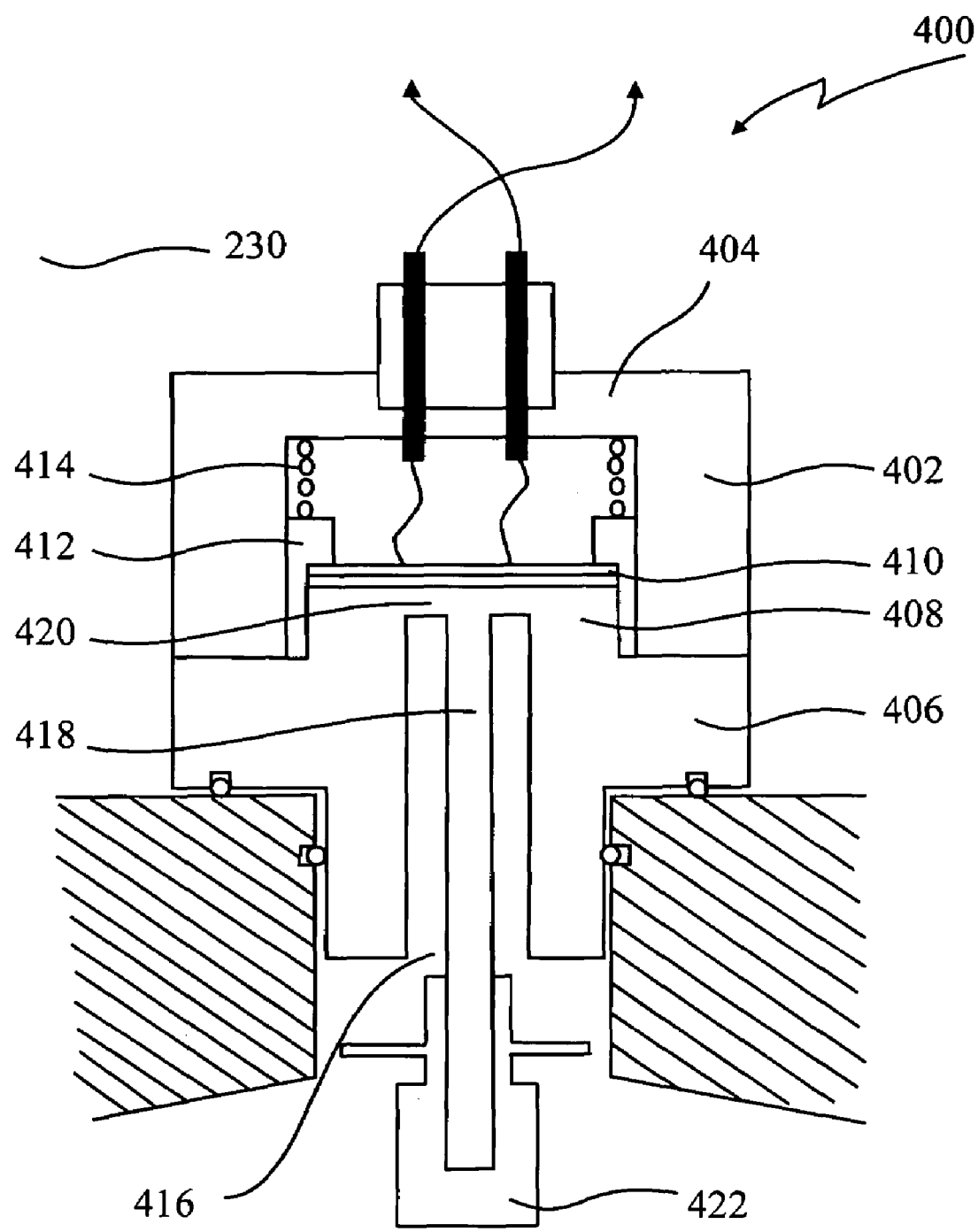
FIG. 21 shows another alternative of the clamping of the sensing element of FIG. 20.

A similar arrangement is seen in FIG. 21 in which the sensor device 400 has the housing side wall 402 as an extension of the cover 404. The operative base 406 has a boss 408 on which the sensing element 410 in the form of a stack of two discs is clamped by means of press fitted clamps 412 which are spring loaded by spring elements 414. Again, a recess 416 is formed in the operative base 406 and a rod 418 extends from a diaphragm-mechanical actuator 420 formed in the base. The pick up member 422 is fitted at the free end of the rod 418.

Figure 22:
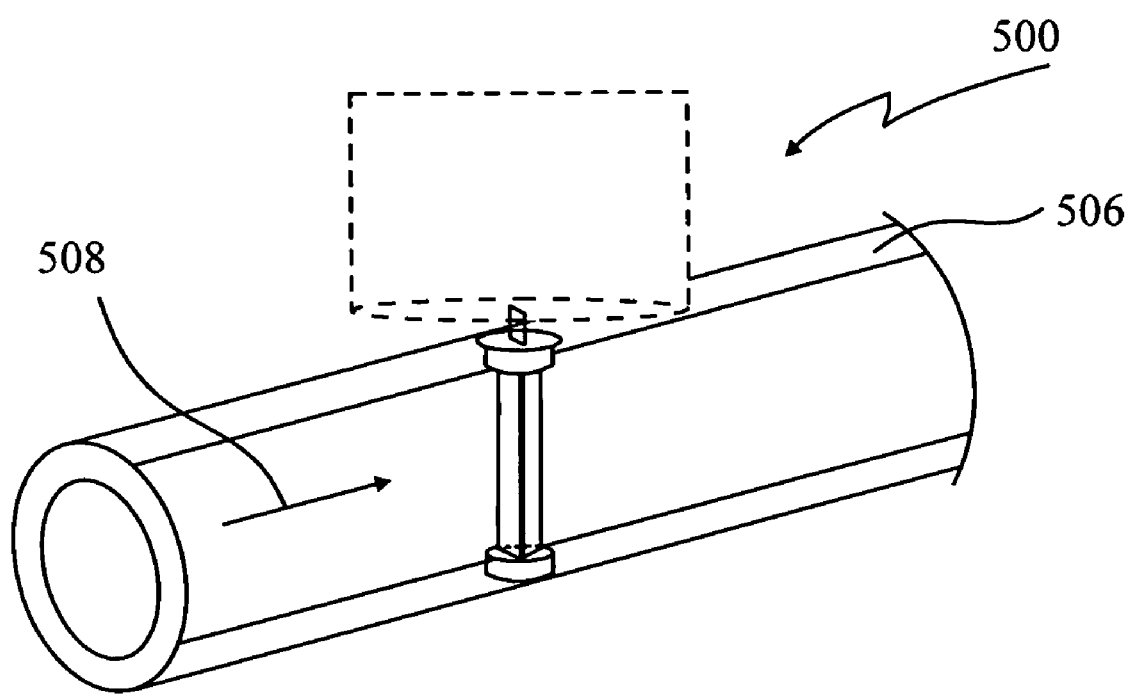
FIGS. 22 and 22(a) show a variation of the interface element as fitted for fluid flow sensing.
Figure 22A:
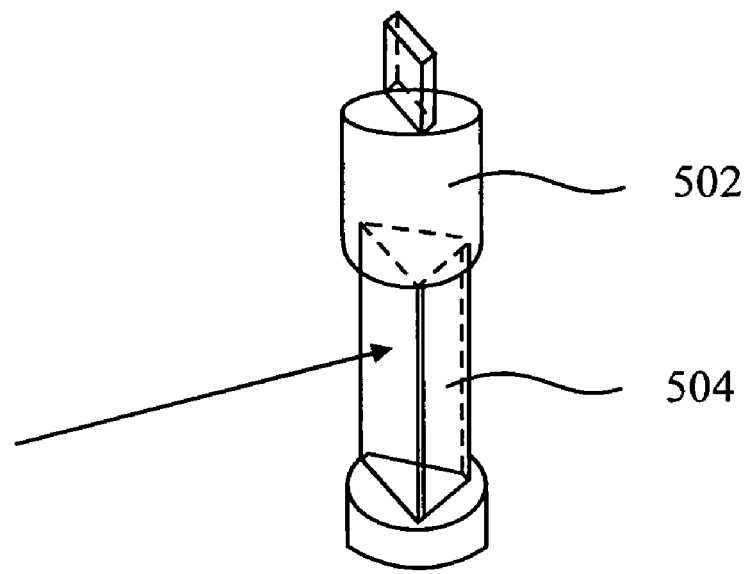

FIGS. 22 and 22(a) illustrate a modification of a sensor device 500 particularly showing the transfer member 502 and the pick up member is a bluff body 504 mounted in a flow conduit 506 in the path 508 of flow.

Figure 23:
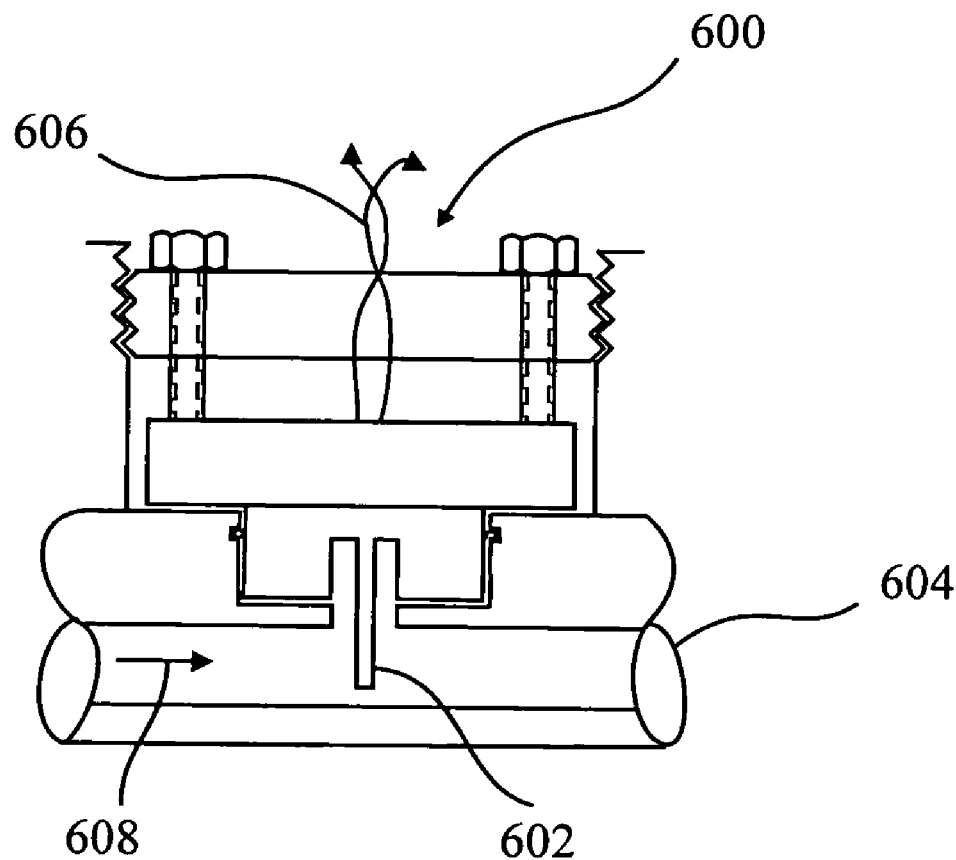
FIGS. 23 and 23(a) shows an embodiment of the sensor device in accordance with this invention fitted in a flow switch.
Figure 23A:
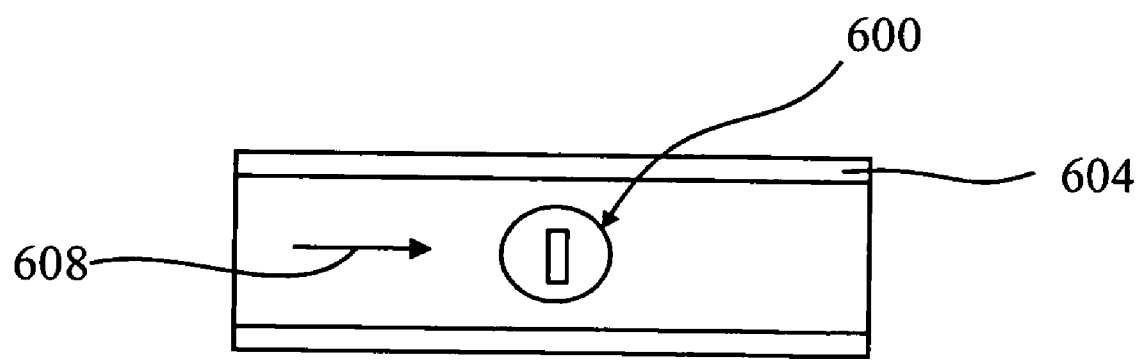

FIGS. 23 and 23(a) illustrate the use of a sensor device 600 as a flow switch in which the transfer member itself 602 itself is the pick up member fitted in a conduit 604 which operates a control circuit [not shown] connected to leads 606 when a flow 608 is sensed in the conduit 604.

Figure 24:
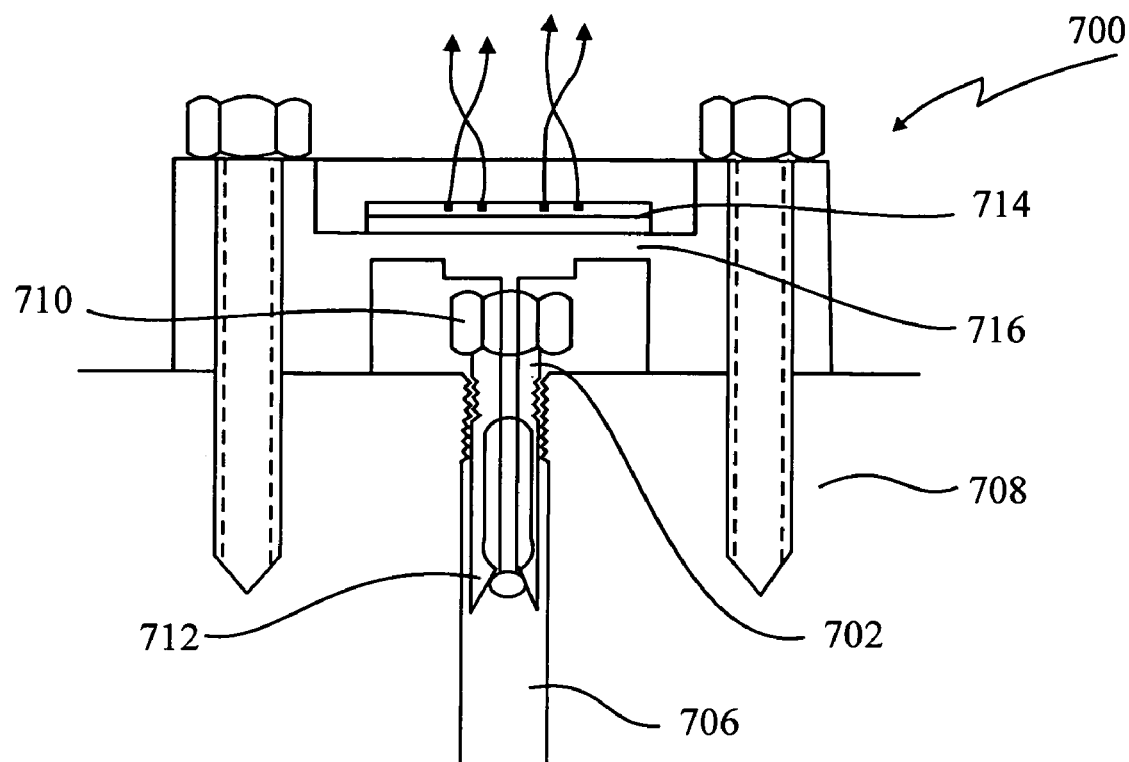
FIG. 24 shows an embodiment of the sensor device as applied to a stress measuring instrument.
Figure 24A:
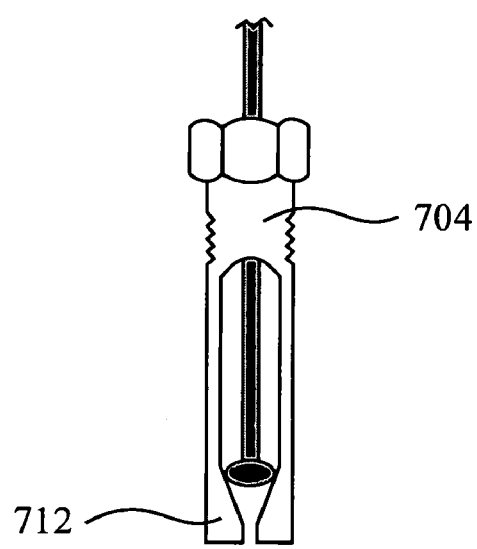
FIG. 24(a) shows a variation of the interface element for the sensor device of FIG. 24.

FIGS. 24 and 24(a) are practical embodiments of the use of the sensing device 700 used in a strain gauge where the elaborate pick up member 702 or 704 is mounted in a hole 706 in a machine body 708. Tightening the nut 710 causes the prongs 712 to extend on abut tightly against the walls of the hole. The entire arrangement of the pick up member 702 acts as a pick up member and a transfer member which provide deformation forces, when the body 708 is subjected to any sort of stress or strain, to the sensing element 714 after suitable amplification via the diaphragm 716 acting as the mechanical actuator.

Figure 25:
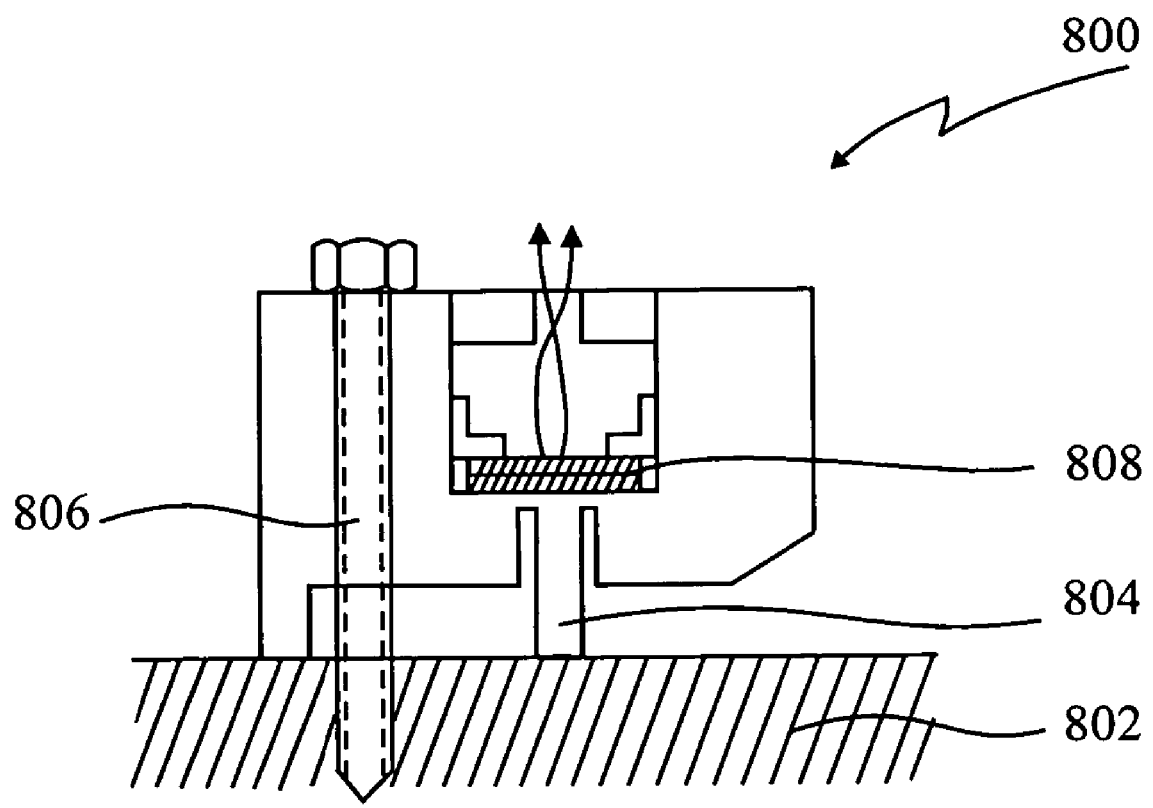
FIG. 25 shows an embodiment of the sensor device as used in a measuring instrument to measure and detect strain on the surface of a machine.

FIG. 25 shows a variation of a strain gauge in which the sensor device 800 is fitted by means of a fitment 806 on the surface of a machine body 802. The transfer member cum pick up member 804 is made to touch the machine body surface and signals after amplification are passed on to the sensing element 808 in the usual way.

The sensor device, in accordance with this invention, can be used to sense varying force pulses generated by pressure fluctuations, vibrations or any movement, stress, strain in the desired direction and can also be used in Robotics as a sensory organ. A robotic arm used in automated assemblies need flow tubing and piping which move at very high speeds along with the arm. Sudden changes due to leakages or blockages need to be instantaneously detected to take corrective action.

The sensor can also detachably mounted in a (pipe) measuring tube. The weight is substantially reduced due to design features and hence a very high natural frequency is obtained.

These senor devices can be directly used in vortex flow meters for fluids like steam the meter size ranging from $\frac{1}{8}^{th}$ inch to 108 inches diameter pipelines. In line type full bore flow meters can be designed with the sensor device in accordance with this invention and for pipe diameters larger than 10 inches insertion type flow meters can be designed.

Very small size of flow meters $\frac{1}{8}^{th}$ inch to ½ inch size can be made using the sensor device in accordance with this invention. In the case of vortex shedding flow meters, the Bluff body can be directly attached to the sensing vane [pick up], or, sensing vane can be machined, shaped to form a bluff body. This can be a great advantage for manufacturing small size Flow Meters.

The sensor itself can be placed in the wake of the fluid in hydrodynamic oscillator type meters to sense the fluctuations and thus the frequency.

Another sensing application would be sensing Torsional vibrations in Engines, motor pump or rotating machinery where sensing can be done in selected direction.

The sensor device can be used to monitor vibrations and forces in cutting tools and high speed CNC machines, machining centers or turning, milling machines.

For high temperature and high pressure, Flow meter application, such as steam or molten Naphtha the sensor can be welded to the body without forming an integral part of the Bluff body.

It has been found out that due to the geometry, a very thick mechanical actuator-diaphragm can be used enhancing the safety of the sensor for long working durations at high temperature and high pressure.

The sensor element can be adhesively bonded to mechanical actuator-diaphragm, or be in firm contact with pre-loading sleeve placed inside the housing.

The boss machined at the bottom of the diaphragm on the outside, is so machined that it transmits the desired signal, stress, strain in the selected direction only. The other sides of the boss can have tapered sections so that it strengthens the mechanical actuator diaphragm and does not transmit any undesired signals in the opposite direction.

Another variation in the design would be to have a Boss machined on the other side and a vane machined parallel to the sensor vane. Two sensor discs can be attached-bonded to two surfaces of this vane and signals can be sensed.

Also, another variation can be the sensors pre-loaded by a turning fork type clamp can be provided on both sides of the vanes.

While considerable emphasis has been placed herein on the structures and structural interrelationships between the component parts of the preferred embodiments, it will be appreciated that many embodiments can be made and that many changes can be made in the preferred embodiments without departing from the principals of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A sensor device for measuring frequency and amplitude of a varying force signal the sensor device, consisting of:
   (i) a sensing element defined by a plurality of even numbered planar segment symmetrically disposed about a central axis, each of the segments being responsive to the frequency and amplitude of said varying signal and ambient noise signals associated with the said varying signal, the said segments connected in pairs to each other about the said central axis, such that the segments form discrete sets, said sets responding equally in magnitude but opposite in direction to the said noise signal and said sets responding differentially to the said varying signals to generate noise cancelled output signals, proportionate to the frequency and amplitude of the said varying signal;
   (ii) protective housing for housing the said sensing element, the said housing defined by side walls, an operative base and cover, the said sensing element being fitted to the base of housing;
   (iii) interface element comprising:
      a) a pick up member for picking up the said varying signals, the said pick up member being centrally disposed with respect to the said central axis of the said sensing element;
      b) a planar mechanical actuator adapted to deform in response to the said varying signal, the said actuator cooperating with the sensing element;
      c) a transfer member adapted to receive varying signals from the pick up, amplify the signals picked up and transfer the amplified signals to the said mechanical actuator; and
   (iv) leads for transmitting said output signals outside the sensing device for processing.

2. A Sensor Device as claimed in claim 1, in which the sensing element is selected from a group of elements consisting of a piezo electric element, a capacitive element, a piezo resistant element, pressure sensitive elements, an optical element, a piezo electric PVDF film element, quartz element, semi conducting elements, piezo electric crystal element, Gallium Orthophosphate Element, Magneto strictive element, doped silicon wafers, and an eddy current type sensing element.

3. A sensor Device as claimed in claim 1, in which the sensing element is selected from a group of element types consisting of a Round Disc, an Oval disc, a Rectangular plate, a disc of geometric shape, a disc of non-geometric shape, a Disc of Optical Fiber cluster, Stack of any one of the aforesaid elementtypes and bodies having an operative planer surface.

4. A Sensor Device as claimed in claim 1, in which the segments are formed on the Sensing element with non sensing segment spaces therebetween.

5. A sensor Device as claimed in claim 1, in which the segments are assembled together with non-sensing spaces between to form the said sensing element.

6. A Sensor Device as claimed in claim 1, in which the segments are internally connected to form pairs.

7. A Sensor Device as claimed in claim 1, in which the segments are externally connected to form pairs.

8. A Sensor Device as claimed in claim 1, in which the sensing element is fitted to the base of the housing by a method selected from a group of methods comprising adhesive bonding, brazing, soldering, welding, clamping, screwing, riveting, vacuum deposition, encapsulation and forming on a diaphragm.

9. A Sensor Device as claimed in claim 1, in which the pick up element is selected from a group of elements consisting of the following element types: vane, tapered wedge, Ball, Inverted cone, cylindrical Rod, fin plate, hollow pipe, and Bluff body.

10. A Sensor Device as claimed in claim 1, in which Interface element base is integral with operative base of the said Housing.

11. A Sensor Device as claimed in claim 1, in which the mechanical actuator Member of the Interface Element is integral with the operative base of the said housing.

12. A Sensor Device as claimed in claim 1, in which the Pick Up Member and the Transfer member of the Interface element are integral.

13. A Sensor Device as claimed in claim 1, in which the operative base of the housing is provided with a recess and the said mechanical actuator of the transfer member is provided within the said Recess.

14. A Sensor Device as claimed in claim 1, in which the said Mechanical Actuator of the Interface Element is formed in the operative base of the said Housing.

15. A Sensor Device as claimed in claim 1, in which the transfer Member is in the form of a uniform rod, pipe or tube.

16. A Sensor Device as claimed in claim 1, in which the Transfer member is in the form of a non-uniform rod, pipe or tube, and at least a portion of the Transfer member lies in the axis perpendicular to the said central axis of the said Sensor Element.

17. A Sensor Device as claimed in claim 1, in which dampening means are provided to control amplification provided by the transfer member.

18. A Sensor Device as claimed in claim 1, in which the Transfer member is fitted centrally to the said mechanical actuator and extends centrally with respect to the said central axis in a direction perpendicular to the said central axis.

19. A Sensor Device as claimed in claim 1, in which the actuator is fitted to the said Operative Base of the housing by a process selected from a group of processes which includes Adhesive bonding, brazing, Soldering, Welding, Clamping, Screwing, Riveting and encapsulation.

20. An instrument for detection and measurement of flow of fluids having a sensor device in accordance with claim 1 fitted therein.

21. An instrument for monitoring and measurement of vibrating force associated with a dynamic machine with the sensor device of claim 1 fitted therein.

22. An instrument for monitoring and measurement of stress associated with a machine with the sensor device of claim 1 fitted therein.

23. An instrument for monitoring and measurement of strain associated with a machine with the sensor device of claim 1 fitted therein.

* * * * *